(12) United States Patent
Yamazaki et al.

(10) Patent No.: US 8,408,628 B2
(45) Date of Patent: Apr. 2, 2013

(54) STORABLE SEAT FOR VEHICLE

(75) Inventors: Takuji Yamazaki, Toyokawa (JP); Noriyuki Zaiki, Toyokawa (JP)

(73) Assignee: Shiroki Corporation, Kanagawa (JP)

( * ) Notice: Subject to any disclaimer, the term of this patent is extended or adjusted under 35 U.S.C. 154(b) by 272 days.

(21) Appl. No.: 13/063,081

(22) PCT Filed: Dec. 26, 2008

(86) PCT No.: PCT/JP2008/073743
§ 371 (c)(1),
(2), (4) Date: Mar. 9, 2011

(87) PCT Pub. No.: WO2010/073372
PCT Pub. Date: Jul. 1, 2010

(65) Prior Publication Data
US 2011/0163566 A1   Jul. 7, 2011

(51) Int. Cl.
*B60N 2/02* (2006.01)
(52) U.S. Cl. .................................................. 296/65.05
(58) Field of Classification Search ............... 296/65.05, 296/65.01, 65.03, 65.09; 297/378.12, 15, 297/322, 342, 344.15, 331, 334, 341, 366; 248/421, 429
See application file for complete search history.

(56) References Cited

U.S. PATENT DOCUMENTS

| | | | | |
|---|---|---|---|---|
| 4,979,773 A | * | 12/1990 | Eubank | 296/65.05 |
| 5,195,795 A | * | 3/1993 | Cannera et al. | 296/65.09 |
| 5,528,778 A | * | 6/1996 | Shrock et al. | 5/37.1 |
| 6,106,046 A | * | 8/2000 | Reichel | 296/65.09 |
| 6,582,003 B2 | * | 6/2003 | Fourrey et al. | 296/64 |
| 6,644,730 B2 | * | 11/2003 | Sugiura et al. | 297/15 |
| 6,676,198 B2 | * | 1/2004 | Demptos et al. | 296/187.03 |
| 6,705,658 B2 | * | 3/2004 | Jach et al. | 296/65.09 |
| 6,837,530 B2 | * | 1/2005 | Rudberg et al. | 296/65.09 |
| 6,869,138 B2 | * | 3/2005 | Rhodes et al. | 297/15 |
| 6,997,498 B2 | * | 2/2006 | Oyama | 296/65.05 |
| 7,014,260 B2 | * | 3/2006 | Moriyama et al. | 297/15 |
| 7,063,368 B2 | * | 6/2006 | Kayumi | 296/65.05 |

(Continued)

FOREIGN PATENT DOCUMENTS

| | | |
|---|---|---|
| JP | 45-40511 B1 | 12/1970 |
| JP | 47-37978 Y1 | 11/1972 |

(Continued)

OTHER PUBLICATIONS

International Search Report of PCT/JP2008/073743 (Feb. 2, 2009).

*Primary Examiner* — Kiran B Patel
(74) *Attorney, Agent, or Firm* — Millen, White, Zelano & Branigan, P.C.

(57) ABSTRACT

A storable vehicle seat is provided, which can be rotationally moved smoothly and can further be prevented from wobbling in a seating state even though the storable vehicle seat has a structure in which the rotational path of the seat is defined by front and rear links.

An elongated support hole 52 and a guide hole 53 are formed in a seat cushion frame 50, a rotational support shaft 30 which is rotatably engaged in the elongated support hole 52 to be relatively movable therein and a guide projection 60 which is engaged in the guide hole 53 to be movable therein are projected from an end of the front link 27, and an extension spring S is installed between the rotational support shaft 30 and a locking projection 56 of the seat cushion frame 50 to bias the rotational support shaft 30 rearwardly.

2 Claims, 7 Drawing Sheets

U.S. PATENT DOCUMENTS

| | | | |
|---|---|---|---|
| 7,108,306 B2* | 9/2006 | Suda et al. | 296/65.08 |
| 7,201,425 B2* | 4/2007 | Tsujibayashi et al. | 296/65.09 |
| 7,213,861 B2* | 5/2007 | Yokoyama et al. | 296/65.09 |
| 7,240,950 B2* | 7/2007 | Fourrey et al. | 296/66 |
| 7,252,320 B2* | 8/2007 | Tsujibayashi et al. | 296/65.09 |
| 7,273,243 B2* | 9/2007 | Prugarewicz | 296/65.09 |
| 7,328,939 B2* | 2/2008 | Moriyama et al. | 297/15 |
| 7,377,582 B2* | 5/2008 | Fukada et al. | 297/15 |
| 7,497,511 B2* | 3/2009 | Park et al. | 297/15 |
| 7,537,260 B2* | 5/2009 | Epaud | 296/65.09 |
| 7,695,058 B2* | 4/2010 | Satta et al. | 297/15 |
| 7,699,399 B2* | 4/2010 | Satta et al. | 297/378.12 |
| 7,717,489 B2* | 5/2010 | Mitsuhashi | 296/65.09 |
| 8,038,206 B2* | 10/2011 | Ito et al. | 297/15 |
| 8,109,555 B2* | 2/2012 | DeVoss et al. | 296/65.08 |
| 8,123,272 B2* | 2/2012 | Ito et al. | 296/65.09 |
| 8,141,930 B2* | 3/2012 | Sayama | 296/65.09 |
| 8,186,753 B2* | 5/2012 | Fujisawa et al. | 297/15 |
| 8,297,678 B2* | 10/2012 | Nakao et al. | 296/65.09 |
| 2002/0047287 A1* | 4/2002 | Kawasaki | 296/64 |
| 2003/0094830 A1* | 5/2003 | Kamida et al. | 296/65.09 |
| 2004/0046408 A1* | 3/2004 | Satoh et al. | 296/65.09 |
| 2004/0169404 A1 | 9/2004 | Imajo et al. | |
| 2004/0174038 A1* | 9/2004 | Sumida et al. | 296/65.09 |
| 2005/0006920 A1* | 1/2005 | Moriyama et al. | 296/65.08 |
| 2005/0269843 A1* | 12/2005 | McGowan et al. | 297/15 |
| 2006/0181113 A1* | 8/2006 | Perin | 297/15 |
| 2006/0214477 A1 | 9/2006 | Fukada et al. | |
| 2007/0126253 A1* | 6/2007 | Nabil et al. | 296/65.09 |
| 2007/0273172 A1* | 11/2007 | McLaughlin et al. | 296/66 |
| 2008/0150312 A1* | 6/2008 | Lehr et al. | 296/65.08 |
| 2008/0169668 A1* | 7/2008 | Muramatsu | 296/37.14 |
| 2011/0049954 A1* | 3/2011 | Watanabe | 297/344.1 |
| 2011/0080029 A1* | 4/2011 | Shimizu | 297/334 |
| 2012/0025581 A1* | 2/2012 | Watanabe | 297/354.12 |

FOREIGN PATENT DOCUMENTS

| | | |
|---|---|---|
| JP | 11-48840 A | 2/1999 |
| JP | 2004-262293 A | 9/2004 |
| JP | 2006-264582 A | 10/2006 |

* cited by examiner

STORABLE SEAT FOR VEHICLE

TECHNICAL FIELD

The present invention relates to a storable seat apparatus for a vehicle.

BACKGROUND ART

A storable seat apparatus for a vehicle is disclosed in Japanese Unexamined Patent Publication 2006-264582 (hereinafter referred to as the prior art document).

In the prior art document, a seat mounting surface and a storage recess positioned behind the seat mounting surface are formed on a floor surface in a vehicle. A pair of left and right front links and a pair of left and right rear links are rotatably connected at their lower ends to the floor surface via hinge mechanisms, and a seat cushion of the seat is rotatably connected to the upper ends of the pair of left and right front links and the pair of left and right rear links via hinge mechanisms. In addition, the front links and the rear links are connected via cables to make the rotating operations thereof link with each other, and an electric motor for rotationally driving the rear links is mounted to the seat cushion.

Accordingly, if the electric motor is actuated with the seat in the storage position (stored position), in which the seat is positioned in the storage recess, the front links and the rear links rotate by the driving force of the electric motor. Thereupon, the seat rotationally moves to the operating position, in which the seat is placed on the seat mounting surface, in accordance with a rotating path defined by the four links. Additionally, if the electric motor is driven reversely with the seat in the operating position, the seat rotationally moves to the storage position in accordance with the rotating path that is determined by the four links.

SUMMARY OF INVENTION

Technical Problem

If the rotating path of the seat is determined by a link mechanism configured of front and rear links in a manner such as disclosed in the prior art document, the seat can be rotationally moved with the seat cushion being maintained parallel to the floor surface.

However, if the accuracy of installation positions of the front and rear links with respect to the seat cushion and the floor surface deteriorates even slightly, the rotational resistance of each hinge mechanism during rotational movement of the seat increases, which makes smooth rotational movement of the seat impossible.

An object of the present invention is to provide a storable vehicle seat which can be rotationally moved smoothly and can further be prevented from wobbling in a sitting state while having a structure in which the rotational path of the seat is defined by the front and rear links.

Solution to Problem

The prevent invention is characterized by a storable vehicle seat, including a seat having a seat cushion; a front link and a rear link, respective both ends of which are rotatably connected to a vehicle floor surface including a seat mounting surface and a storage recess that are aligned in a forward/rearward direction, and the seat cushion, respectively, to move the seat rotationally between a storage position at which the seat is positioned in the storage recess and an operating position at which the seat is positioned immediately above the seat mounting surface; a rotational support shaft projected from one of the front link or/and the rear link, and the seat cushion or/and a stationary member on the vehicle floor surface; an elongated support hole which is formed on the other to be elongated in substantially the forward/rearward direction, with which the rotational support shaft is rotatably engaged, and to which the rotational support shaft relatively changes a position thereof in accordance with a position of the seat cushion; a guide projection which is projected from the front link or/and the rear link on which the rotational support shaft or the elongated support hole is formed; a guide hole which is formed in the seat cushion or the stationary member in which the elongated support hole or the rotational support shaft is formed, wherein the guide projection is engaged with the guide hole to be movable therein, wherein the guide hole has a substantially circular arc shape centered about a point within the elongated support hole, wherein a portion of the guide hole in which the guide projection is positioned when the seat is in the operating position has the same width as that of the guide projection, and wherein a portion of the guide hole in which the guide projection is positioned when the seat is on a side closer the storage position than the operating position is greater in width than the guide projection; and a biaser which biases the rotational support shaft in one direction along the elongated support hole.

It should be noted that the term "same width" does not only refer to the guide projection and that portion of the guide hole perfectly matching in dimension with each other. More specifically, the term "same width" is a concept also including the case where a sliding resistance is produced between that portion of the guide hole and the guide projection to restrict rotation of the front link or/and the rear link from the operating position with a slight clearance existing between the guide projection and that portion of the guide hole.

It is desirable for the guide projection to be projected from one of the seat cushion and at least one of the front link and the rear link. A temporary holding recess, which holds a position of the front link or the rear link by engagement with the guide projection when the front link or the rear link, from which the guide projection is projected, is positioned outside a range from the storage position to the operating position and when a lower end of the front link or the rear link is positioned higher than a lower limit of movement thereof, is formed in a portion of the guide hole that is formed in the other of the seat cushion and at least one of the front link and the rear link.

Advantageous Effects of Invention

According to the invention of claim 1, the seat can be rotationally moved while the seat cushion and the vehicle floor surface maintain parallel to each other because the rotating path of the seat (the seat cushion and the seatback) is determined by the front link and the rear link.

Moreover, since the rotational support shaft that serves as a rotational center of the link is slidably movable in the elongated support hole in the forward/rearward direction and also since the width of the guide hole is greater than the diameter of the guide projection, except for a portion thereof in which the guide projection is positioned when the seat is in the operating position, the rotational connecting mechanism between the front and rear links and the seat cushion or a stationary member on the vehicle floor side operates smoothly at all times (except when the seat is in the operating position), even if the accuracy of installation positions of the front and rear links with respect to the seat cushion and the stationary member on the floor surface slightly deteriorates. Furthermore, when the seat rotationally moves toward the operating position, the rotational support shaft which receives a biasing force from the biaser moves in the elongated support hole in a stable manner, so that no excessive force is exerted on the rotational connecting mechanism until immediately before the seat reaches the operating position. Accordingly, the seat can be rotationally moved in a smooth manner.

Furthermore, when the seat is in the operating position, the guide projection is engaged with a portion of the guide hole which has the same width as that of the guide projection, which prevents the links from rattling with respect to the seat cushion and the vehicle floor. Accordingly, a stable sitting state can be provided to the passenger.

If configured in a manner such as disclosed in claim 2, the storable vehicle seat according to the present invention can be temporarily held, before being mounted to a vehicle floor, in a state where at least one of the front link and the rear link becomes substantially parallel to the seat cushion. If the seat can be temporarily held in such a state, the dimension of the entire storable vehicle seat in the vertical direction is smaller compared with the case where the seat is not held temporarily, and accordingly, the storable vehicle seat can be inserted into a vehicle without the front link nor the rear link interfering with the edge of an opening in a back side or a lateral side of the vehicle body, and without needing to be lifted to a high position.

REFERENCE SIGNS LIST

Figure 1:
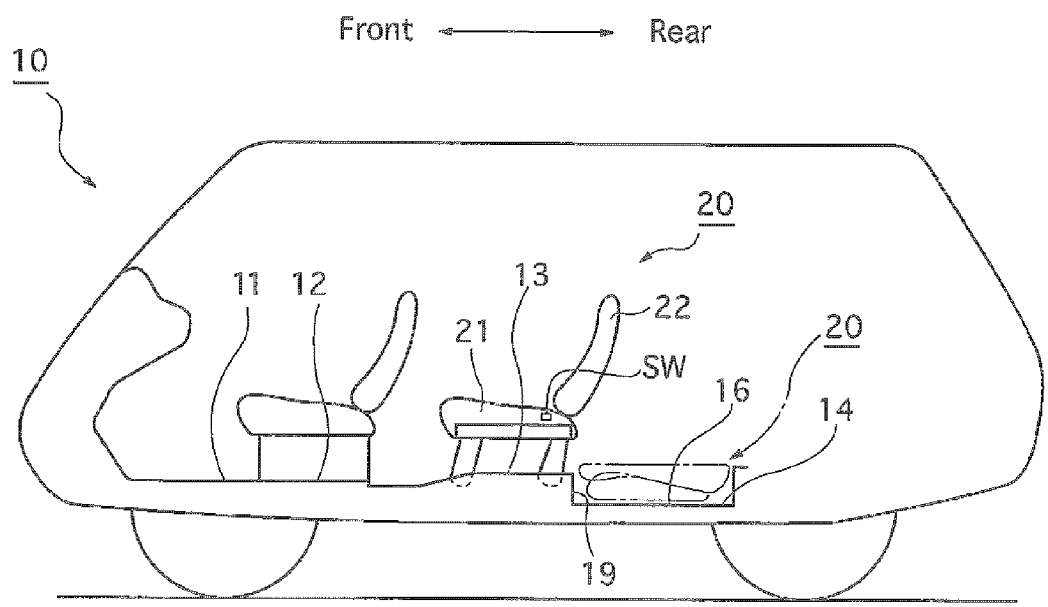
FIG. 1 is a side view of a vehicle to which a first embodiment of a storable seat apparatus according to the present invention has been applied.

10 Vehicle
11 Floor surface
12 13 Seat mounting surface
14 Storage recess
16 Bottom surface of storage recess
17F 17R Striker
18 Striker
19 Front wall of storage recess
20 Storable seat apparatus
21 Seat cushion
22 Seatback
25 Front bracket (stationary member on vehicle floor surface)
26 Rotational shaft
27 Front link
28 Welded nut
29 through-hole
30 Rotational support shaft
30A Support pin
30A1 Large-diameter portion
30A2 Small-diameter portion
30A3 Threaded portion
30A4 Annular ring
30B First cylindrical member
31 Rear bracket (stationary member on vehicle floor surface)
32 Rotational shaft
33 Rod (rear link)
35 Rear leg (rear link)
36 Striker entrance groove
37 Rotational shaft
38 Rotational connecting member (rear link)
40 Rotational shaft
41 Connection link
44 Rotational shaft
45 Front leg
48 Rotational shaft
50 Seat cushion frame (seat cushion)
51 Support portion
52 Elongated support hole
53 Guide hole
54 Temporary holding recess
56 Locking projection
57 Hook member
60 Guide projection
60A Guide pin
60A1 Large-diameter portion
60A2 Small-diameter portion
60A3 Threaded portion
60B Second cylindrical member
N Nut
S Extension spring (biaser)
SW Lock release switch

DESCRIPTION OF EMBODIMENTS

A first embodiment according to the present invention will be hereinafter discussed with reference to FIGS. 1 through 8. It should be noted that, in the following description, forward, rearward, leftward and rightward directions are represented with reference to the directions described in the drawings (which is true also to the second embodiment).

As shown in FIGS. 1 through 4, a floor surface 11 in a vehicle 10 is provided with a seat mounting surface 12, a seat mounting surface 13 and a storage recess 14, arranged from front to rear, and the storage recess 14 is positioned immediately behind the rear seat mounting surface 13.

A storable seat apparatus 20 that serves as a second-row seat is a seat that is capable of being stored in the storage recess 14 and mounted on the seat mounting surface 13. The specific structure of this seat will be discussed hereinafter.

The storable seat apparatus 20 is provided with a seat cushion 21 and a seatback 22, the lower end of which is rotatably connected to the rear end of the seat cushion 21 via a rotational shaft extending in the left/right direction. The seatback 22 is rotatable between an upright position (the position shown in FIG. 1) in which the seatback 22 stands approximately perpendicular to the seat cushion 21 and a folded position (position shown in FIGS. 2 through 4) in which the seat cushion 21 lies substantially parallel to the seat cushion 21.

Two strikers 17F are provided in the vicinity of the front end of the seat mounting portion 13 as a pair of left and right projections, and two strikers 17R are provided in the vicinity of the rear end of the seat mounting portion 13 as a pair of left and right projections.

Figure 2:
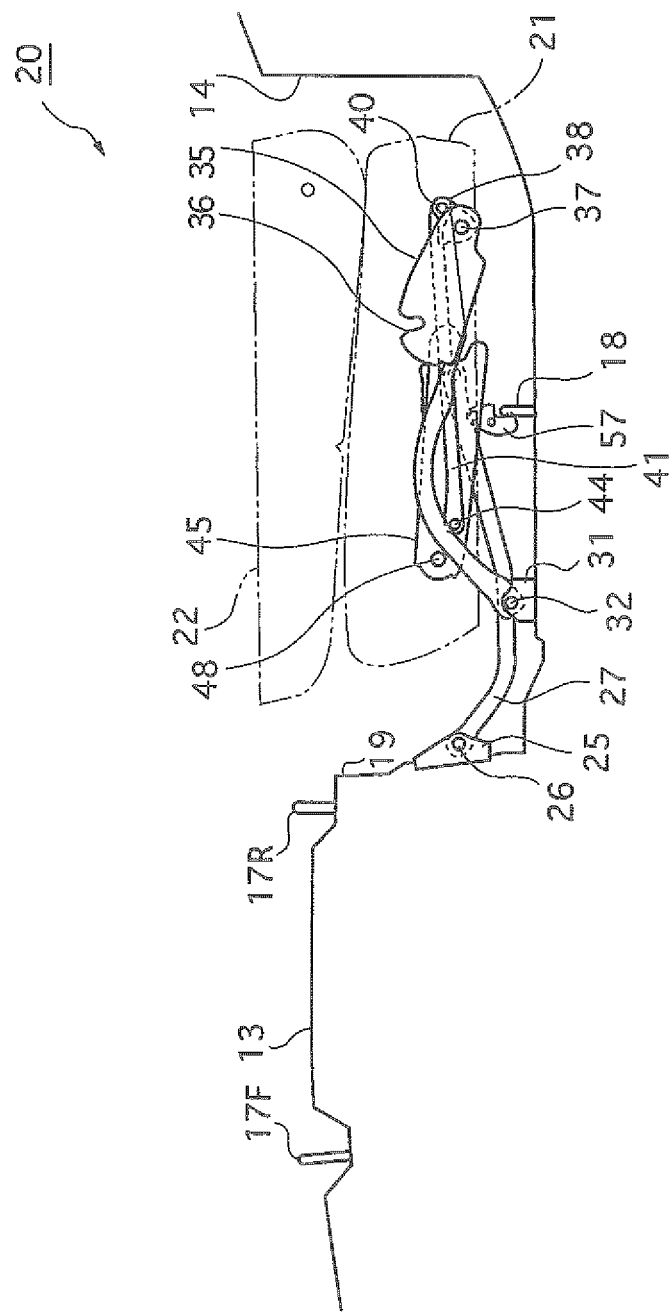
FIG. 2 is a side view showing a state when the seat is in a storage position.
Figure 3:
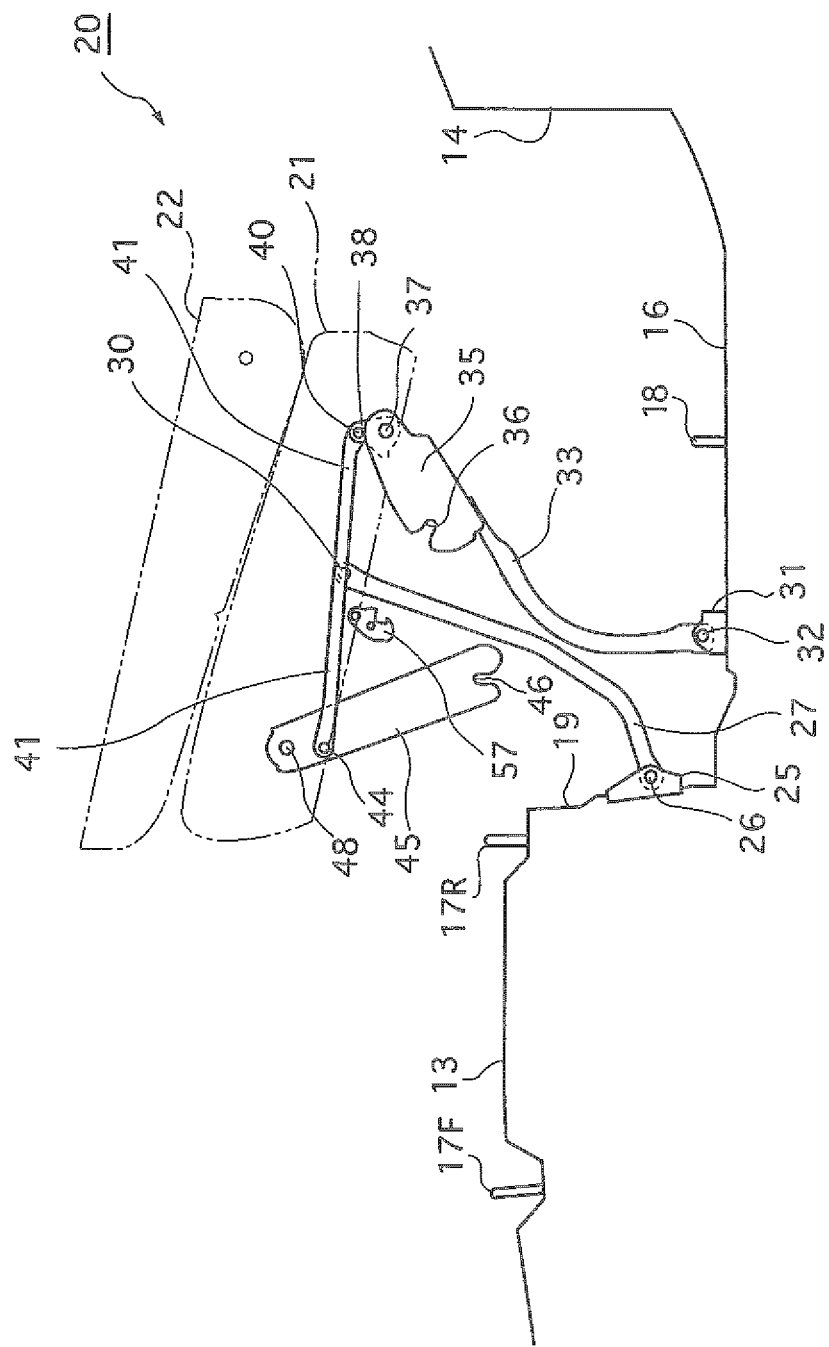
FIG. 3 is a side view showing a state when the seat has rotationally moved toward the operating position.
Figure 4:
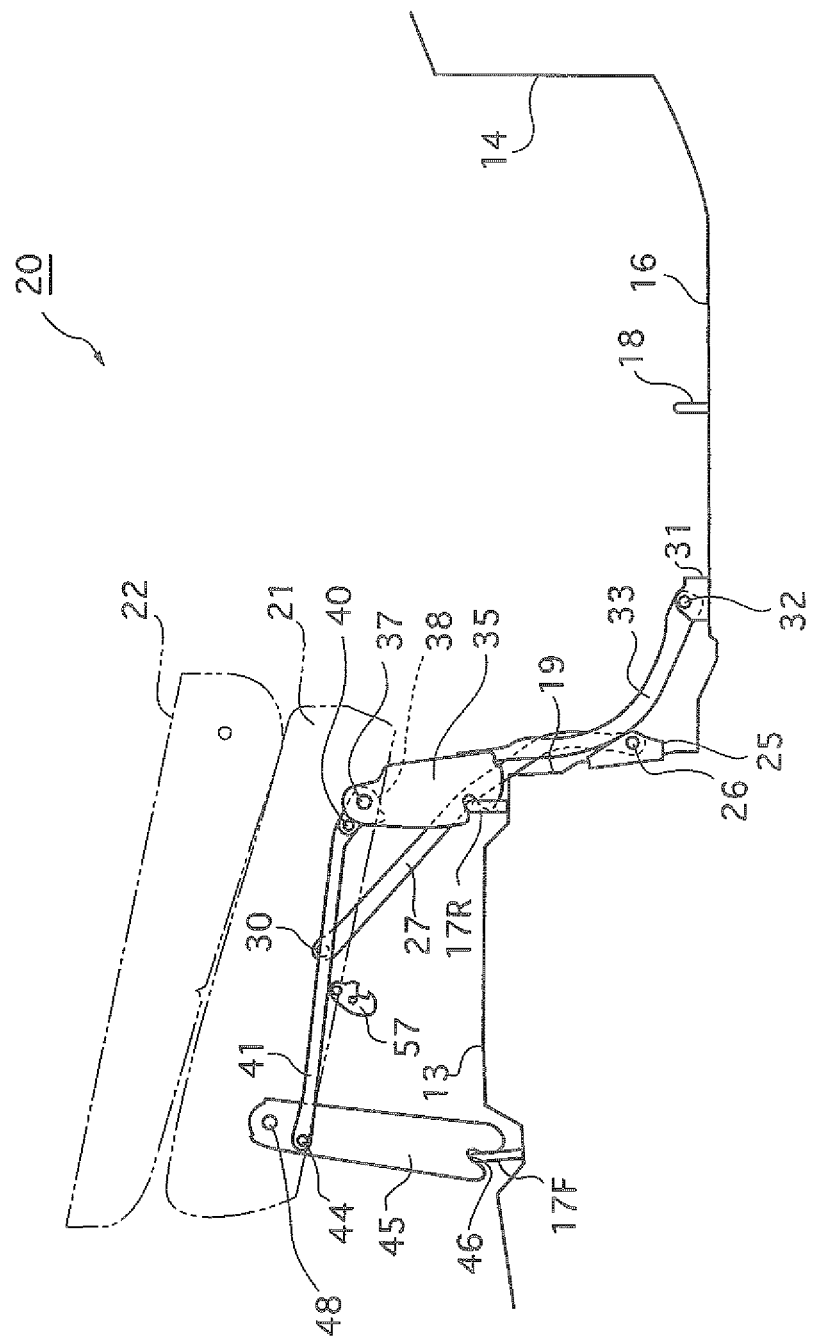
FIG. 4 is a side view showing a state when the seat is in the operating position.

As shown in FIGS. 2 through 4, a striker 18 is provided on a central portion of a bottom surface 16 of the storage recess 14. A metal front bracket (stationary member on a vehicle floor surface) 25 is fixed to a front wall 19 of the storage recess 14 at a central portion of the front wall 19 with respect to the left/right direction, and the lower end of a metal front link 27 is rotatably supported by the front bracket 25 via a rotational shaft 26 extending in the left/right direction. The front link 27 can rotate about the rotational shaft 26 between a front rotational limit position (see FIG. 4) and a rear rotational limit position (see FIG. 2) at which the front link 27 becomes approximately parallel to the bottom surface 16. A pair of left and right seat cushion frames 50 (elements of the seat cushion) made of metal and extending in the forward/rearward direction are fixed to a bottom surface (top surface) in a bottom space (not shown) formed in the bottom of the seat cushion 21, and the upper end of the front link 27 is rotatably connected to the pair of left and right seat cushion frames 50 via a rotation support shaft 30 extending in the left/right direction.

A pair of left and right metal rear brackets (stationary members on a vehicle floor surface) 31 are fixed to the bottom surface 16 of the storage recess 14 in the vicinity of the front end thereof, and portions of a metal rotational shaft 32 extending in the left/right direction in the vicinity of the left and right ends thereof are rotatably supported by the left and right rear brackets 31, respectively. A pair of left and right metal rods 33 are fixed at the lower ends thereof to the left and right ends of the rotational shaft 32, respectively. In addition, a pair of left and right metal rear legs 35 are fixed at lower ends thereof to the upper ends of the left and right rods 33, respectively. A striker entrance groove 36 is formed in a front surface near the lower end of each rear leg 35. Additionally, although not shown in the drawings, a known rear lock mechanism which is equipped with a rotatable hook and a rotatable pole and can be engaged with and disengaged from the associated striker 17R that is provided on an inner surface of each of the left and right rear legs 35.

Left and right rotational connecting members 38 positioned in the aforementioned bottom space are rotatably connected to the upper ends of the left and right rear legs 35, respectively, which are positioned in the aforementioned bottom space of the seat cushion 21, via a rotational shaft 37 extending in the left/right direction (the rotational connecting members 38, the rods 33 and the rear legs 35 are elements of rear links). In addition, the rear ends of left and right connection links 41, which extend in the forward/rearward direction, are rotatably connected to the left and right rotational connecting members 38 respectively, via rotational shafts 40 extending in the left/right direction. The left and right connection links 41 are positioned in the aforementioned bottom space, and the left and right rotational shafts 40 are rotatably supported by the seat cushion frames 50.

The lower ends of the rods 33 are rotatably supported by the rear brackets 31 via the rotational shaft 32, and the upper ends of the rear legs 35 are connected to the seat cushion frames 50 via the rotational shaft 37, the rotational connecting members 38 and the rotational shaft 40; therefore, the rods 33 and the rear legs 35 can rotate between a rear rotational limit position (see FIG. 4) and a front rotational limit position (see FIG. 2) in which the rods 33 and the rear legs 35 become substantially parallel to the bottom surface 16.

As shown in the drawings, the front ends of the left and right connection links 41 are connected to left and right metal front legs 45 in the vicinity of the upper end portions thereof via rotational shafts 44, each extending in the left/right direction. The left and right front legs 45 are connected to each other via a connecting member not shown in the drawings which extends in the left/right direction, and the upper ends of the left and right front legs 45 are rotatably connected to the seat cushion frames 50 via rotational shafts 48 extending in the left/right direction.

The left and right front legs 45 are linked up with the left and right rear legs 35 via the left and right connection links 41 and the left and right rotational connecting members 38, and accordingly, the rear legs 35, the rods 33, and the front legs 45 rotate synchronously. More specifically, when the rear legs of one of the rear legs 35 and the front legs 45 are in an accommodation position (see FIG. 2) to be accommodated in the bottom space of the seat cushion 21, the other rear legs thereof are also in an accommodated position to be accommodated in the bottom space of the seat cushion 21, and when the rear legs of one of the rear legs 35 and the front legs 45 are in an orthogonal position (see FIG. 4) to be substantially orthogonal to the seat cushion 21, the other rear legs thereof are also in an orthogonal position to be substantially orthogonal to the seat cushion 21.

Although not shown in the drawings, a known front lock mechanism which is equipped with a rotatable hook and a rotatable pole and can be engaged with and disengaged from the associated striker 17F is provided on an inner surface of each of the left and right front legs 45.

In addition, a hook member 57 is rotatably supported by the seat cushion frames 50, which are fixed to a bottom surface in the bottom space of the seat cushion 21, via a rotational shaft extending in the left/right direction. The hook member 57 is a member which can be engaged with and disengaged from the striker 18 that projects from the storage recess 14, can rotate between an engageable position (position shown in FIGS. 2 through 4) in which the hook member 57 is engageable with the striker 18 and a non-engaging position (not shown) in which the hook member 57 is not engageable with the striker 18, and is biased to rotate toward the engaging position by a spring device not shown in the drawings.

As shown in FIG. 1, the seat cushion 21 is provided on a right side surface thereof with a lock release switch SW. The lock release switch SW is slidable between a lock allowable position shown in FIG. 1 and a lock release position, not shown in the drawings, and is normally held in the lock allowable position by the biasing force of a spring device, not shown in the drawings. The lock release switch SW is for controlling the lock/unlock state of the hook member 57, the aforementioned rear lock mechanisms that are provided on the rear legs 35, and the aforementioned front lock mechanisms that are provided on the front legs 45 when the seatback 22 is in the folded position. More specifically, no influence is exerted on the hook member 57, the rear lock mechanisms nor the front lock mechanisms when the seatback 22 is in the upright position; however, the hook member 57 is allowed to be in the engaging position and each of the rear lock mechanisms and the front lock mechanisms is allowed to move into the locked state when the lock release switch SW is in the lock allowable position with the seatback 22 in the folded position, and the hook member 57 is made to move to the non-engaging position and each of the rear lock mechanisms and the front lock mechanisms is made to move into the unlocked position when the lock release switch SW is in the lock release position with the seatback 22 in the folded position.

Figure 5:
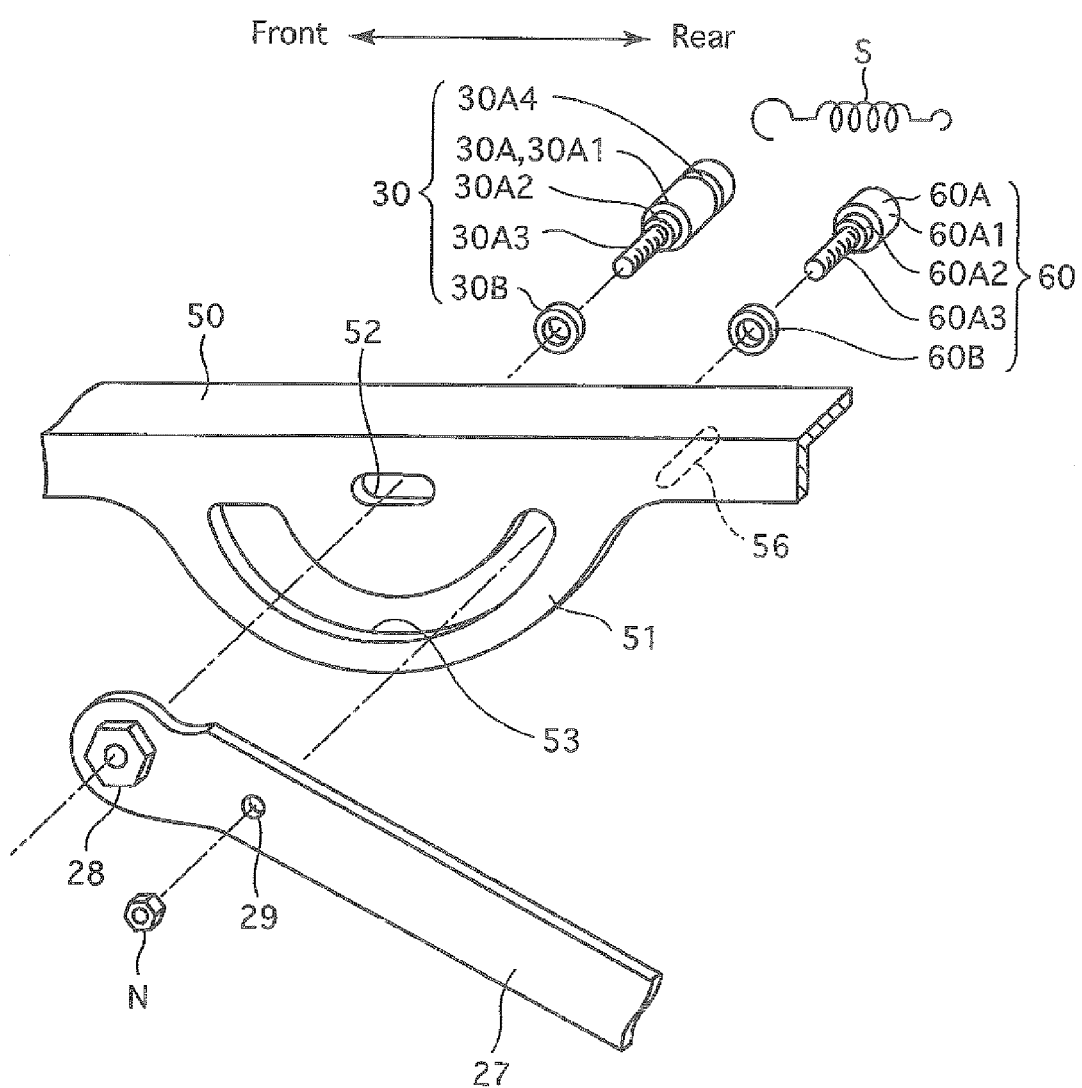
FIG. 5 is an exploded perspective view showing a seat cushion frame, a front link and a rotational connecting mechanism.

Next, the rotational connecting mechanism between the front link 27 and the seat cushion frames 50, which is a point of the present invention, will be hereinafter discussed in detail with reference to FIG. 5.

A support portion 51 in the shape of a substantially semi-circle is formed on the seat cushion frame 50 at a substantially central position in the lengthwise direction thereof. The support portion 51 is provided with an elongated support hole 52 elongated in the forward/rearward direction and a guide hole 53 that is shaped in a substantially circular arc which is centered about a point within the elongated support hole 52 ach of the elongated support hole 52 and the guide hole 53 is formed as a through-hole. The guide hole 53 is not uniform in width; the width of the guide hole 53 is the greatest at the front end thereof and gradually decreases in the direction toward the rear end of the guide hole 53. In addition, two horizontal locking projections 56 which are positioned at the same height as the elongated support hole 52 project from surfaces of the left and right seat cushion frames 50 which face each other, respectively.

The rotational support shaft 30 is equipped with a support pin 30A and a first cylindrical member 30B. The support pin 30A, which is made of metal, is a rotational body that is rotatable about the central axis thereof that extends in the left/right direction. The support pin 30A is provided with a large-diameter portion 30A1, a small-diameter portion 30A2 which is continuous with an end of the large-diameter portion 30A1, and a threaded portion 30A3 having the smallest diameter which extends from an end of the small-diameter portion 30A2, and an annular groove 30A4 is formed on the large-diameter portion 30A1. The first cylindrical member 30B is a resin product, the inner peripheral surface of the first cylindrical member 30B is a cylindrical surface which has substantially the same diameter as that of the small-diameter portion 30A2, and the outer peripheral surface of the first cylindrical member 30B is a cylindrical surface, the diameter of which is substantially the same as the width of the elongated support hole 52. The first cylindrical portion 30B is rotatably fitted on the small-diameter portion 30A2 and positioned inside of the elongated support hole 52. The threaded portion 30A3 extends through the elongated through-hole 52 and a through-hole (not shown) formed through the upper end of the front link 27 to be screw-engaged with a welded nut 28 which is welded to an outer surface of the front link 27 to be coaxial with the aforementioned through-hole. Accordingly, the front link 27 can rotate about the rotational support shaft 30. In addition, since the length of the elongated support hole 52 in the forward/rearward direction is greater than the diameter of the first cylindrical member 30B, the upper end of the front link 27 is slidable along the elongated support hole 52.

A through-hole 29 is formed in a portion of the front link 27 at a position slightly lower than the upper end of the front link 27, and this portion is connected to the guide hole 53 via a guide projection 60.

The guide projection 60 is equipped with a support pin 60A and a second cylindrical member 60B. The support pin 60A, which is made of metal, is a rotational body that is rotatable about the central axis thereof that extends in the left/right direction. The support pin 60A is provided with a large-diameter portion 60A1, a small-diameter portion 60A2 which is continuous with an end of the large-diameter portion 60A1, and a threaded portion 60A3 having the smallest diameter which extends from an end of the small-diameter portion 60A2. The second cylindrical member 605 is a resin product, the inner peripheral surface of the second cylindrical member 60B is a cylindrical surface which has substantially the same diameter as that of the small-diameter portion 60A2, and the outer peripheral surface of the second cylindrical member 60B is a cylindrical surface the diameter of which is determined so as to allow the second cylindrical member 608 to be inserted into the guide hole 53. The second cylindrical portion 60B is rotatably fitted on the small-diameter portion 60A2 and positioned inside the elongated support hole 53. The threaded portion 60A3 extends through the through-hole 29 of the front link 27, and a nut N positioned outside the front link 27 is screw-engaged with the threaded portion 60A3. Accordingly, a rotation of the front link 27 about the rotational support shaft 30 causes the portion of the front link 27, in which the through-hole 29 is formed, to rotate about the rotational support shaft 30 while being guided by the guide projection 60 and the guide hole 53.

In addition, both ends of an extension spring (biaser) S extended in the forward/rearward direction are fixedly engaged with the annular groove 30A4 of the support pin 30A and the locking projection 56, so that the rotational support shaft 30 is biased to move rearward at all times.

Next, operations of the storable seat apparatus that has the above described structure will be discussed hereinafter.

When the seatback 22 is in the folded position and the front link 27, and the rods 33 and the rear legs 35 are in the rear rotational limit positions, the seat (the seat cushion 21 and the seatback 22 will be collectively referred to as the seat hereinafter) is in the storage position, in which the entire seat is positioned in the storage recess 14 as shown in FIG. 2. In addition, since the hook member 57 in the engaging position is engaged with the striker 18, the seat cannot move from the storage position.

Figure 6:
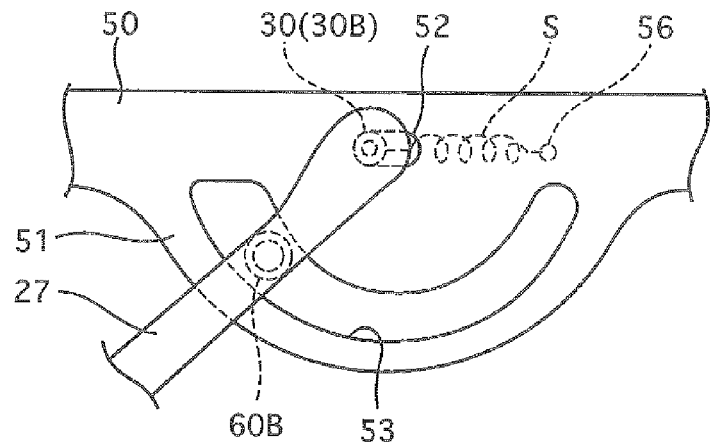
FIG. 6 is a side view of the seat cushion frame, the front link and the rotational connecting mechanism when the seat is in the storage position.

The positional relationship between the upper end of the front link 27 and the seat cushion frame 50 at this time is as shown in FIG. 6. As shown in FIG. 6, the rotational support shaft 30 is positioned at the front end of the elongated support hole 52 against the biasing force of the extension spring S while the guide projection 60 is in the guide hole 53 in the vicinity of the front end thereof. The width of this portion of the guide hole 53 is greater than the diameter of the second cylindrical member 60B, and accordingly, the second cylindrical member 60B and the guide hole 53 are not in contact with each other; moreover, the rotational support shaft 30 is slidably movable in the elongated support hole 52. Therefore, even if the accuracy of installation positions of the front link 27 and the front bracket 25 with respect to the floor surface 11 or the accuracy of installation positions of the rods 33 and the rotational connecting members 38 with respect to the rear brackets 31 and the seat cushion frames 50 slightly deteriorates, no excessive force is exerted on the rotational connecting mechanism.

Sliding the lock release switch SW in the lock allowable position to the lock release position causes the hook member 57 to move to the non-engaging position, thus causing the engagement of the hook member 57 with the striker 18 to be released. Accordingly, if a force is applied to the seat in an obliquely upward and forward direction while returning the lock release switch SW to the lock allowable position causes the seat to rotationally move forward in accordance with a rotational path defined by the front link 27 and the rods 33 (and the rear legs 35 and the rotational connecting members 38).

Figure 7:
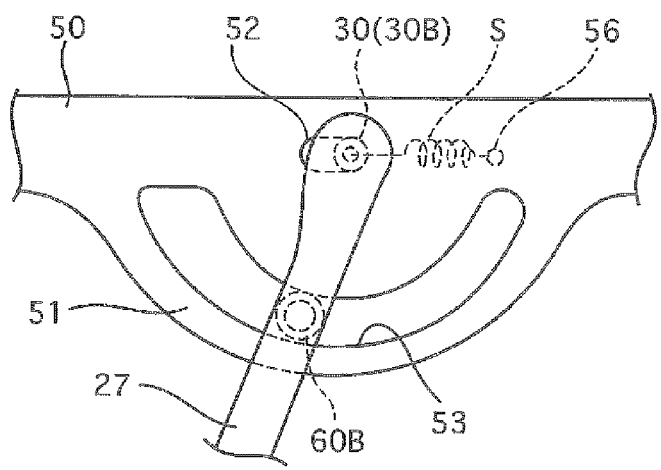
FIG. 7 is a side view similar to that of FIG. 6, showing a state when the seat is in the position shown in FIG. 3.

FIG. 7 shows the positional relationship between the upper end of the front link 27 and the seat cushion frame 50 when the front link 27 has rotated to the position shown in FIG. 3. As shown in FIG. 7, the rotational support shaft 30 has moved to the rear end of the elongated support hole 52 while receiving the biasing force of the extension spring S, and the guide projection 60 is positioned at a middle portion of the guide hole 53. Since the width of this portion of the guide hole 53 is greater than the diameter of the second cylindrical member 60B, the second cylindrical member 60B and the guide hole 53 are not in contact with each other. This non-contact state continues immediately before the seat reaches its operating position; moreover, the rotational support shaft 30 that receives the biasing force of the extension spring S moves in the elongated support hole 52 in a stable manner, so that no excessive force is exerted on the rotational connecting mechanism until immediately before the seat reaches the operating position. Accordingly, the seat can be made to move smoothly until immediately before reaching the operating position. Furthermore, since the rotational path of the seat is defined by the front link 27 and the rods 33 (and the rear legs 35 and the rotational connecting members 38), the seat cushion 21 remains substantially parallel to the floor surface 11 at all times during the rotational movement thereof.

Rotation of the seat to the operating position as shown in FIG. 4 causes the rear legs 35 and the front legs 45 to be positioned at the aforementioned orthogonal position, the strikers 17F enter striker engaging grooves 46 of the front legs 45, respectively, and the striders 17R enter striker engaging grooves 36 of the rear legs 35, respectively. Thereupon, the aforementioned front lock mechanisms that are provided on the front legs 45 lock the strikers 17F, respectively, while the aforementioned rear lock mechanisms that are provided on the rear legs 35 lock the strikers 17R, respectively, so that the seat is held in the operating position. Thereafter, rotating the seatback 22 to the upright position as shown in FIG. 1 causes the seat to move into a state where a passenger can sit thereon.

Figure 8:
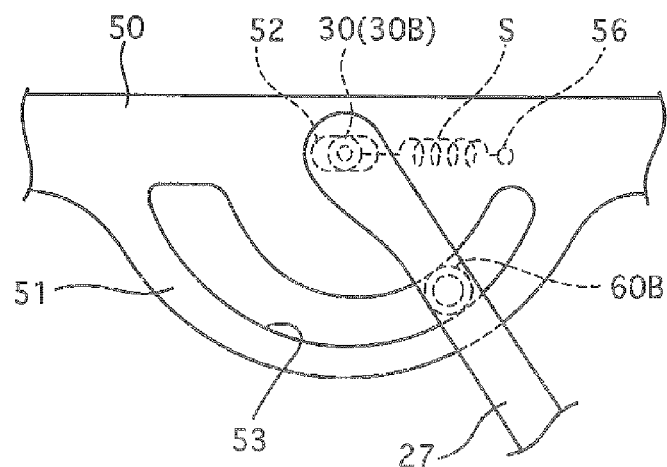
FIG. 8 is a side view similar to that of FIG. 6, showing a state when the seat is in the operating position.

FIG. 8 shows the positional relationship between the upper end of the front link 27 and the seat cushion frame 50 when the seat has rotated to the operating position. As shown in FIG. 8, the rotational support shaft 30 has moved to a middle position in the elongated support hole 52 while receiving the biasing force of the extension spring S, and the guide projection 60 is positioned in a portion of the guide hole 53 in the vicinity of the rear end thereof The width of this portion of the guide hole 53 is to the same as the diameter of the second cylindrical member 60B. Therefore, the outer peripheral surface of the second cylindrical member 60B is in contact with the guide hole 53, which stabilizes a supported state of the front link 27 by the seat cushion frames 50. Consequently, the seat cushion 21 does not become wobbly even if a passenger sits on the seat.

From this state, to return the seat to the storage position shown in FIG. 2, the lock release switch SW positioned in the lock allowable position is brought to slide to the lock release position after the seatback 22 is returned to the folded position to move the front lock mechanisms and the rear lock mechanisms into the unlocked state. Thereafter, if a moving force is applied to the seat in the rearward direction, the seat rotationally moves rearward in accordance with the aforementioned rotational path.

If the lock release switch SW is returned to the lock allowable position and the seat is rotationally further moved rearward, the seat moves to the storage position. During this rotating operation, the rotational support shaft 30, the guide projection 60 and the extension spring S operate in the reverse manner to the above described manner, so that the seat can rotationally move smoothly until reaching the storage position.

Upon the seat reaching the storage position, the hook member 57 is automatically engaged with the striker 18, so that the seat is held in the storage position.

Figure 9:
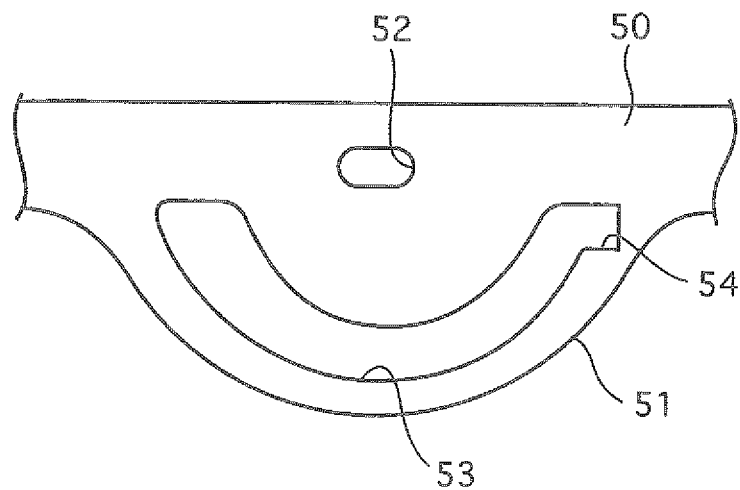
FIG. 9 is a side view of a main part of the seat cushion frame in a second embodiment of the storable seat according to the present invention.

Next, the second embodiment according to the present invention will be discussed with reference mainly to FIGS. 9 and 10. Elements the same as those in the first embodiment are designated by the same reference numerals, and the repetitive descriptions for those are omitted in the following descriptions.

The storable seat apparatus 20 is assembled outside of the vehicle 10 and inserted into the vehicle 10 through a rear opening (not shown) opened by opening aback lid (not shown) of the vehicle 10. However, since the front link 27, the rods 33 and the rear legs 35 are long, as shown in FIGS. 2 through 4, the dimension of the vertical storable seat apparatus 20 in the vertical direction becomes extremely great if the front link 27, the rods 33 and the rear legs 35 are made to hang down (if the lower ends thereof are positioned at their lowest positions). Therefore, if the storable seat apparatus 20 in such a state is not lifted to a sufficient height when brought into the vehicle through the aforementioned rear opening, there is a possibility of the lower ends of the front link 27 and the rods 33 interfering with the lower edge of the rear opening. However, since the storable seat apparatus 20 is reasonably heavy in weight, it is a great strain for the worker to lift the storable seat apparatus 20 high.

Accordingly, in the present embodiment, a temporary holding recess 54 is formed in the guide hole 53 at the rear end thereof. The width (dimension in the vertical direction) of the temporary holding recess 54 is to the same as the diameter of the second cylindrical member 60B, and the width of a portion of the guide hole 53 which ranges from the portion of the guide hole 53 in which the second cylindrical member 60B (the guide projection 60) is positioned when the seat is in the operating position to the temporary holding recess 54 is also to the same as the diameter of the second cylindrical member 60B.

Figure 10:
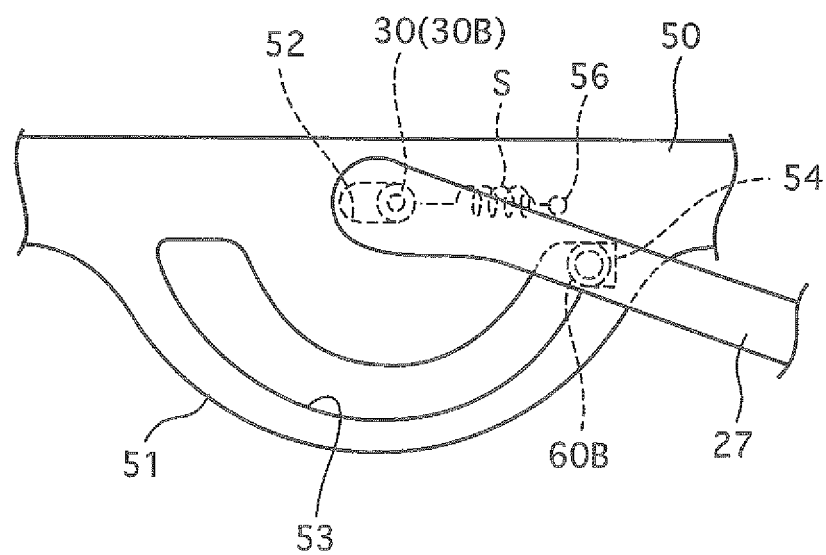
FIG. 10 is a side view similar to that of FIG. 6, showing a state when the front link in the second embodiment is temporarily held.

Before the storable seat apparatus 20 is inserted inside the vehicle 10, rotating the ends (lower ends) of the front link 27, the rods 33 and the rear legs 35 to the positions shown in FIG. 10 causes the guide projection 60 (the second cylindrical member 60B thereof) to be engaged with the temporary holding recess 54 after passing through a portion of the guide hole 53 in which the guide projection 60 is positioned when the seat is in the operating position. Thereupon, even if the worker lets go of the front link 27, the rods 33 and the rear legs 35, the front link 27, the rods 33 and the rear legs 35 are temporarily held in this particular state, so that the dimension of the storable seat apparatus 20 in the vertical direction becomes smaller than that when the front link 27, the rods 33 and the rear legs 35 are positioned at their lowest positions. Accordingly, the storable seat apparatus 20 becomes capable of being inserted into the vehicle 10 without interfering with the edge of the rear opening of the vehicle 10 and without needing to be lifted so high.

Thereafter, if the guide projection 60 (the second cylindrical members 60B thereof) is made to be disengaged forwardly from the temporary holding recess 54 by rotating the front link 27, the rods 33 and the rear legs 35 forwardly, the front bracket 25 and the rear bracket 31 can be fixed to the floor surface 11.

Although the present invention has been described based on the first and second embodiments, the present invention is not limited to these embodiments and can be embodied in various ways.

For instance, in the first embodiment, the rotational connecting mechanism that is composed of the elongated support hole 52, the guide hole 53, the rotational support shaft 30, the guide projection 60, the extension spring S and the nut N can be installed between the front link 27 and the front bracket 25, between the rear legs 35 and the seat cushion frames 50, or between the rods 33 and the rear bracket 31. In addition, the rotational connecting mechanism can be installed at more than one place (e.g., between the front link 27 and the seat cushion frames 50 and between the rear legs 35 and the seat cushion frames 50).

Additionally, the rotational connecting mechanism can be installed between the rotational connecting members 38 and the seat cushion frames 50 in the second embodiment. Additionally, in the case where the front link 27 and the rear links (the rods 33, the rear legs 35 and the rotational connecting members 38) do not synchronize with each other, the aforementioned rotational connecting mechanism can be installed between the front link 27 and the seat cushion frames 50 and between the rear legs 35 and the seat cushion frames 50. Additionally, the temporary holding recess 54 can be formed in front of a portion of the guide hole 53 in which the second cylindrical member 6013 (the guide projection 60) is positioned when the seat is in the storage position. Additionally, it is possible for the elongated support hole 52 to be formed in the front link or the rear legs 35 and for projecting members corresponding to the rotational support shaft 30 to be installed to the seat cushion frames 50.

Additionally, rotational support shaft 30 can be equipped integrally with a cylindrical portion instead of the first cylindrical member 30B, wherein the cylindrical portion has the same diameter as that of the first cylindrical member 30B and engaged in the elongated support hole 52. Likewise, the guide projection 60 can be integrally provided with a cylindrical portion instead of the second cylindrical member 60B, wherein the cylindrical portion has the same diameter as that of the second cylindrical member 60B and engaged in the guide hole 53.

In addition, the elongated support hole 52 and the guide hole 53 can be replaced by a bottomed hole (recess).

Additionally, as a biaser for biasing the rotational support shaft, a different biaser (e.g., a compression spring, rubber, etc.) can be used instead of the extension spring.

Additionally, the storage recess 14 can be formed in front of the seat mounting surface 13.

Industrial Applicability

Although having a structure in which the rotational path of the seat is defined by the front and rear links, the seat can be rotationally moved in a smooth manner; moreover, the seat can be prevented from wobbling in a sitting state, and accordingly, the present invention has industrial capability.

The invention claimed is:

1. A storable vehicle seat, comprising:
   a seat having a seat cushion;
   a front link and a rear link, respective both ends of which are rotatably connected to a vehicle floor surface including a seat mounting surface and a storage recess that are aligned in a forward/rearward direction, and said seat cushion, respectively, to move said seat rotationally between a storage position at which said seat is positioned in said storage recess and an operating position at which said seat is positioned immediately above said seat mounting surface;
   a rotational support shaft projected from one of said front link or/and said rear link, and said seat cushion or/and a stationary member on said vehicle floor surface;
   an elongated support hole which is formed on the other to be elongated in substantially said forward/rearward direction, with which said rotational support shaft is rotatably engaged, and to which said rotational support shaft relatively changes a position thereof in accordance with a position of said seat cushion;
   a guide projection which is projected from said front link or/and said rear link on which said rotational support shaft or said elongated support hole is formed;
   a guide hole which is formed in said seat cushion or said stationary member in which said elongated support hole or said rotational support shaft is formed, wherein said guide projection is engaged with said guide hole to be movable therein, wherein said guide hole has a substantially circular arc shape centered about a point within said elongated support hole, wherein a portion of said guide hole in which said guide projection is positioned when said seat is in said operating position has the same width as that of said guide projection, and wherein a portion of said guide hole in which said guide projection is positioned when said seat is on a side closer said storage position than said operating position is greater in width than said guide projection; and
   a biaser which biases said rotational support shaft in one direction along said elongated support hole.

2. The storable vehicle seat according to claim 1, wherein said guide projection is projected from one of said seat cushion and at least one of said front link and said rear link,
   wherein a temporary holding recess, which holds a position of said front link or said rear link by engagement with said guide projection when said front link or said rear link, from which said guide projection is projected, is positioned outside a range from said storage position to said operating position and when a lower end of said front link or said rear link is positioned higher than a lower limit of movement thereof, is formed in a portion of said guide hole that is formed in the other of said seat cushion and at least one of said front link and said rear link.

* * * * *